United States Patent [19]

Cackley

[11] 4,067,427

[45] Jan. 10, 1978

[54] BEARING ARRANGEMENT FOR POWER DRIVE

[75] Inventor: George W. Cackley, Hanna City, Ill.

[73] Assignee: Caterpillar Tractor Co., Peoria, Ill.

[21] Appl. No.: 689,285

[22] Filed: May 24, 1976

[51] Int. Cl.² .......................................... F16D 67/06
[52] U.S. Cl. ............................ 192/110 B; 192/18 A
[58] Field of Search ............ 192/110 B, 110 S, 18 A, 192/18 B

[56] References Cited

U.S. PATENT DOCUMENTS

| | | | |
|---|---|---|---|
| 2,626,031 | 1/1953 | Fawick | 192/110 B X |
| 3,378,120 | 4/1968 | Miller et al. | 192/110 B |
| 3,638,773 | 1/1972 | Lewis | 192/18 A |
| 3,667,581 | 6/1972 | Hanks | 192/18 A |
| 3,776,337 | 12/1973 | Yoshizawa | 192/110 B |
| 3,924,715 | 12/1975 | Cory | 192/18 A |

FOREIGN PATENT DOCUMENTS

| | | | |
|---|---|---|---|
| 383,861 | 11/1907 | France | 192/110 B |

Primary Examiner—Benjamin W. Wyche
Attorney, Agent, or Firm—Wegner, Stellman, McCord, Wiles & Wood

[57] ABSTRACT

A bearing arrangement for use in a power drive having coaxially aligned input and output shafts. The bearing arrangement includes a spread-bearing structure disposed between first and second drive components carried on their respective shafts for maintaining mutually coaxial parallelism of the drive components.

4 Claims, 1 Drawing Figure

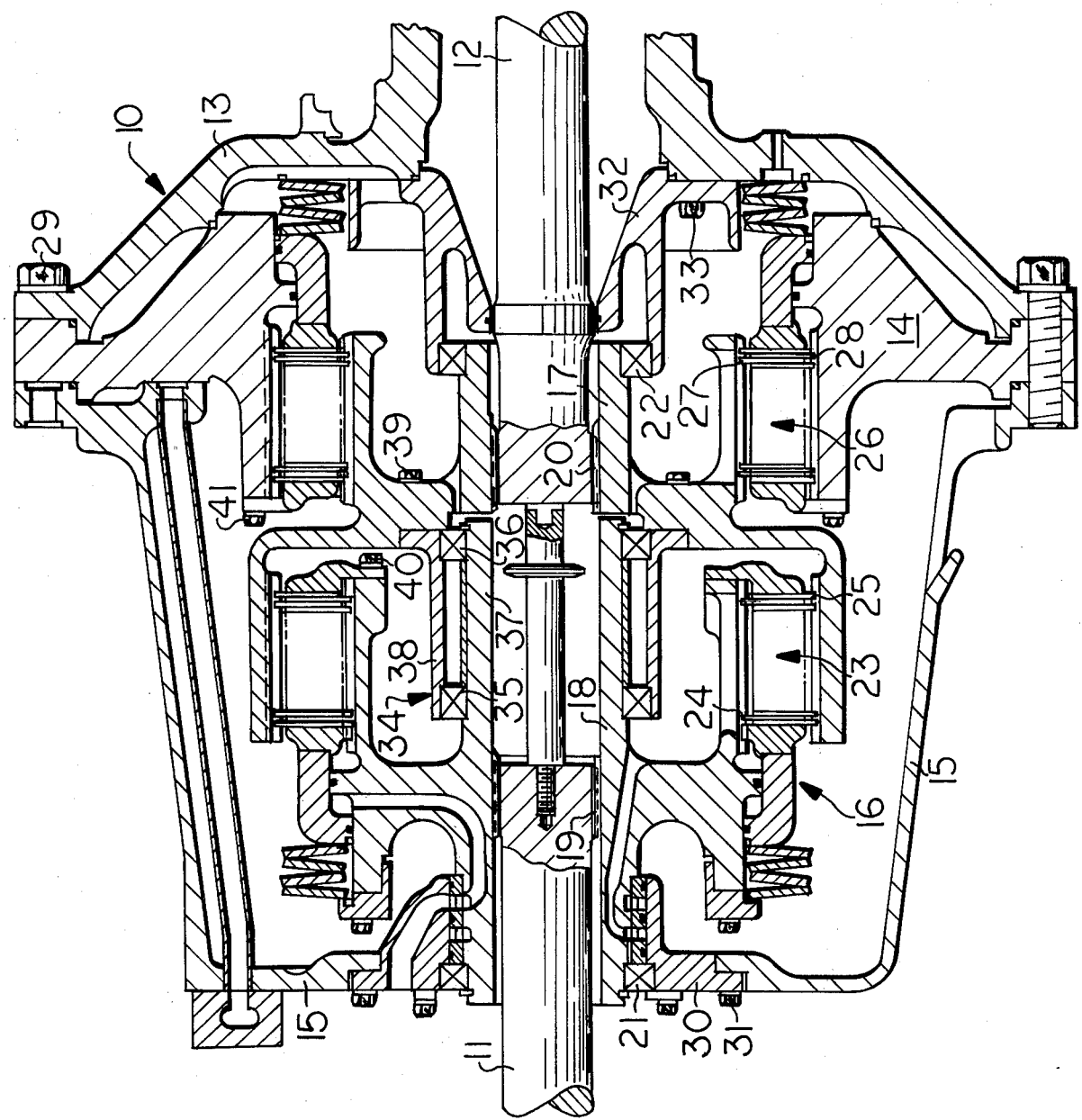

BEARING ARRANGEMENT FOR POWER DRIVE

BACKGROUND OF THE INVENTION

1. Field of the Invention

This invention relates to power drives and in particular to bearing arrangements for use in power drive assemblies.

2. Description of the Prior Art

In one conventional power drive assembly, a clutch is mounted to an input shaft and a brake is mounted to an output shaft, with the shafts being disposed in coaxial alignment.

One example of such a clutch-brake unit is illustrated in United States Letters Patent 3,638,773 of William E. Lewis et al. As disclosed therein, a piston unit is interposed between the clutch disc pack and the brake disc pack. The piston is disposed in an intermediate housing. Operation of the piston actuates either the clutch or brake. The input shaft is mounted for rotation on a pair of ball bearings and is piloted on a third bearing supported in a housing web portion. The output shaft is rotatably mounted on a pair of ball bearings. A self-aligning bearing is provided for supporting the inner end of the output shaft. The self-aligning bearing is carried on an enlarged end portion of the input shaft.

SUMMARY OF THE INVENTION

The present invention comprehends an improved power drive assembly having a spread-bearing means extending between the drive components carried by the input and output shafts for maintaning mutually coaxial parallelism of the drive components.

In the illustrated embodiment, the power drive includes an input shaft, an output shaft, a first stationary housing, a first drive component rotatively carried by the first housing in driven association with the input shaft, a second stationary housing, a second drive component rotatively carried by the second housing in driving association with the output shaft, and means for selectively drivingly connecting the first drive component to the second drive component.

The spread-bearing means of the illustrated embodiment is defined by a pair of coaxially spaced annular bearings extending between concentrically radially spaced overlapping portions of the first and second drive components.

The individual annular bearings of the spread-bearing means may be disposed at the opposite end portions of the overlapped portions of the drive components.

The axial spacing between the bearings is preferably substantially greater than the axial width of the bearings.

In the illustrated embodiment, a first bearing is provided for journaling the first drive component in the first housing, and a second bearing is provided for journaling the second drive component in the second housing coaxially of the first drive component.

Thus, the power drive bearing means of the present invention are extremely simple and economical of construction while yet providing the highly desirable features discussed above.

BRIEF DESCRIPTION OF THE DRAWING

Other features and advantages of the invention will be apparent from the following description taken in connection with the accompanying drawing wherein the FIGURE is a diametric fragmentary longitudinal section of a power drive having improved bearing means embodying the invention.

DESCRIPTION OF THE PREFERRED EMBODIMENT

In the exemplary embodiment of the invention as disclosed in the drawing, a power drive assembly generally designated 10 is shown to include an input shaft 11, an output shaft 12, a first housing 13, a second housing 14, and a case assembly 15.

A hub assembly generally designated 16 is mounted to input shaft 11 for rotation therewith. A carrier 17 is mounted to output shaft 12 for rotation therewith.

More specifically, hub assembly 16 includes a tubular inner portion 18 nonrotatively mounted to shaft 11 by means of splines 19. Carrier 17 is nonrotatively mounted to shaft 12 by means of splines 20.

The hub assembly 16 is rotatably journaled in the case assembly 15 by means of a roller bearing 21. Carrier 17 is rotatably journaled in first housing 13 by a roller bearing 22.

Interposed between hub assembly 16 and carrier 17 is a clutch pack generally designated 23 having alternate clutch discs 24 internally splined to the hub assembly and discs 25 externally splined to the carrier, whereby engagement of the clutch discs effects a rotation of the carrier from the input shaft 11.

The drive assembly further includes a brake pack 26 having first brake disc 27 internally splined to the carrier and alternate brake discs 28 externally splined to the second, or brake housing, 14. Brake housing 14 is fixed to housings 13 and 16 as by bolts 29.

As further shown in the drawing, bearing 21 may be carried by case assembly 16 on a bearing retainer 30 secured to the case assembly by suitable bolts 31 and bearing 22 may be carried on the housing 13 on a retainer 32 secured to the housing 13 by suitable bolts 33.

Hub assembly 16 and carrier 17 are effectively maintained in mutually coaxial parallelism by a spread-bearing means generally designated 34 including a first annular roller bearing 35 and a second annular roller bearing 36 coaxially spaced from roller bearing 35. As shown in the drawing, bearings 35 and 36 are retained between an inner tubular portion 37 of the hub assembly and an outer tubular extension 38 on the carrier. Extension 38 may be secured to the carrier by suitable means, such as bolts 39.

As further illustrated in the drawing, the clutch pack 23 may be secured to the hub assembly by suitable bolts 40 and the brake pack may be secured to the brake housing 14 by suitable bolts 41.

Thus, the carrier and hub assembly are, in effect, overlapped and the power drive assembly is provided with spreadbearing means in the overlapped area of these elements which not only provides an internal support for these elements externally supported by the outboard bearings 21 and 22, but also effectively maintains mutually coaxial parallelism of the drive components. Such parallelism is highly desirable in such drive assemblies to provide improved long life and low maintenance requirements relative to the clutch and brake means of the power drive. The use of the spread-bearing means in the overlapped area of the power drive provides a low cost, novel arrangement. The improved bearing means eliminates the costly and complicated structures of the prior art while yet providing an improved maintained parallelism, as discussed above.

The foregoing disclosure of specific embodiments is illustrative of the broad inventive concepts comprehended by the invention.

What is claimed is:

1. In a power drive having an input shaft, an output shaft coaxially of said input shaft, housing means defining a first stationary portion, a first drive component, first bearing means between said first drive component and said first housing portion directly rotatively carrying said first drive component in said first housing portion in driven association with said input shaft, said housing means further defining a second stationary portion, a second drive component, second bearing means between said second drive component and said second housing portion directly rotatively carrying said second drive component in said second housing portion in driving association with said output shaft, means for braking said second drive component, and means for selectively drivingly connecting said first drive component to said second drive component, the improvement comprising: coaxial radially spaced, axially elongated, overlapping wall means on said first and second drive components; and spread-bearing means extending between said first and second drive component wall means for maintaning mutually coaxial parallelism of said drive components.

2. The power drive of claim 1 wherein said spread-bearing means comprises a pair of coaxial spaced annular bearings.

3. The power drive of claim 1 wherein said spread-bearing means comprises a pair of coaxial spaced annular roller bearings.

4. The power drive of claim 1 wherein said spread-bearing means comprises third and fourth coaxially spaced bearing means coaxially intermediate said first and second bearing means.